United States Patent  
Sato

(10) Patent No.: US 9,342,763 B2  
(45) Date of Patent: May 17, 2016

(54) IMAGE PROCESSING APPARATUS AND METHOD OF CONTROLLING SAME

(71) Applicant: CANON KABUSHIKI KAISHA, Tokyo (JP)

(72) Inventor: Tomoya Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/833,400

(22) Filed: Aug. 24, 2015

(65) Prior Publication Data  
US 2015/0363674 A1 Dec. 17, 2015

Related U.S. Application Data

(63) Continuation of application No. 12/915,294, filed on Oct. 29, 2010, now Pat. No. 9,137,399.

(30) Foreign Application Priority Data

Dec. 16, 2009 (JP) ................................. 2009-285743

(51) Int. Cl.  
G06K 15/00 (2006.01)  
G06K 15/02 (2006.01)  
(Continued)

(52) U.S. Cl.  
CPC .......... *G06K 15/002* (2013.01); *G06K 15/1803* (2013.01); *H04N 1/0049* (2013.01); *H04N 1/00204* (2013.01); *H04N 1/00244* (2013.01); *H04N 1/00411* (2013.01); *H04N 1/00413* (2013.01); *H04N 1/00464* (2013.01); *H04N 1/00474* (2013.01); *H04N 1/00482* (2013.01); *H04N 1/00973* (2013.01); *G06F 3/1204* (2013.01); *G06F 3/1205* (2013.01); *G06F 3/1253* (2013.01); *G06F 3/1271* (2013.01); *G06F 3/1286* (2013.01); *G06F 3/1287* (2013.01); *H04N 1/00387* (2013.01);  
(Continued)

(58) Field of Classification Search  
CPC .................. H04N 2201/0094; H04N 1/00244; H04N 2201/3249; H04L 67/00; H04L 67/02  
USPC ......... 709/223, 224, 203, 217, 219; 358/1.12, 358/1.14, 1.15, 400, 405, 407  
See application file for complete search history.

(56) References Cited

U.S. PATENT DOCUMENTS 6,930,792 B2    8/2005 Cannon et al.  
7,265,859 B2 *  9/2007 Sato ........................ G06K 15/00  
                                                 358/1.15

(Continued)

FOREIGN PATENT DOCUMENTS

JP    2006-127503 A1    5/2006

*Primary Examiner* — Lashonda Jacobs  
(74) *Attorney, Agent, or Firm* — Fitzpatrick, Cella, Harper & Scinto

(57) ABSTRACT

An image processing apparatus includes an operation unit having a hardware key for accepting a user operation and a light emitting device corresponding to the hardware key. A display unit displays an operation screen based on content obtained from a web server. A control unit determines whether the content includes a description for instructing operation to transmit data input via the operation screen to the web server, and causes the light emitting device to emit light in response to having determined that the content includes the description. A transmission unit transmits the data input via the operation screen to the web server when the hardware key is operated by a user while the operation screen is being displayed based on the content including the description.

22 Claims, 10 Drawing Sheets

(51) Int. Cl.
  *H04N 1/00* (2006.01)
  *G06F 3/12* (2006.01)
(52) U.S. Cl.
  CPC  *H04N2201/0039* (2013.01); *H04N 2201/0094* (2013.01)

(56) References Cited

U.S. PATENT DOCUMENTS

| | | |
|---|---|---|
| 7,353,268 B2 | 4/2008 | Miyahira |
| 7,397,362 B2 | 7/2008 | Zhang et al. |
| 7,519,307 B2 | 4/2009 | Lovat et al. |
| 7,532,835 B2 | 5/2009 | Lovat et al. |
| 7,561,286 B2 | 7/2009 | Suto |
| 7,600,018 B2 | 10/2009 | Maekawa et al. |
| 7,633,644 B2 | 12/2009 | Lum et al. |
| 7,684,074 B2 | 3/2010 | Reddy et al. |
| 7,738,806 B2 | 6/2010 | Lovat et al. |
| 7,826,081 B2 | 11/2010 | Stevens et al. |
| 7,870,185 B2 | 1/2011 | Nguyen et al. |
| 7,873,553 B2 | 1/2011 | Zhang et al. |
| 7,873,718 B2 | 1/2011 | Zhang et al. |
| 7,920,101 B2 | 4/2011 | Lum et al. |
| 7,934,217 B2 | 4/2011 | Reddy et al. |
| 7,941,743 B2 | 5/2011 | Reddy et al. |
| 7,966,396 B2 | 6/2011 | Sojian et al. |
| 7,969,596 B2 | 6/2011 | Mathieson et al. |
| 7,970,813 B2 | 6/2011 | Lum et al. |
| 7,978,618 B2 | 7/2011 | Richardson et al. |
| 8,001,183 B2 | 8/2011 | Plewnia et al. |
| 8,001,586 B2 | 8/2011 | Zhang et al. |
| 8,001,587 B2 | 8/2011 | Lovat et al. |
| 8,006,176 B2 | 8/2011 | Reddy et al. |
| 8,006,292 B2 | 8/2011 | Zhang et al. |
| 8,006,293 B2 | 8/2011 | Zhang et al. |
| 8,015,234 B2 | 9/2011 | Lum et al. |
| 8,018,610 B2 | 9/2011 | Mathieson et al. |
| 8,023,130 B2 | 9/2011 | Zhang et al. |
| 8,024,792 B2 | 9/2011 | Zhang et al. |
| 8,032,579 B2 | 10/2011 | Nguyen et al. |
| 8,032,608 B2 | 10/2011 | Sojian et al. |
| 8,035,831 B2 | 10/2011 | Mathieson et al. |
| 8,049,677 B2 | 11/2011 | Lum et al. |
| 8,051,125 B2 | 11/2011 | Lum et al. |
| 8,051,140 B2 | 11/2011 | Lum et al. |
| 8,060,921 B2 | 11/2011 | Lovat et al. |
| 8,060,930 B2 | 11/2011 | Lovat et al. |
| 8,065,384 B2 | 11/2011 | Plewnia et al. |
| 8,106,922 B2 | 1/2012 | Lum et al. |
| 8,115,944 B2 | 2/2012 | Zhang et al. |
| 8,115,945 B2 | 2/2012 | Plewnia |
| 8,115,946 B2 | 2/2012 | Plewnia |
| 8,115,947 B2 | 2/2012 | Yamamura et al. |
| 8,120,793 B2 | 2/2012 | Lovat et al. |
| 8,120,797 B2 | 2/2012 | Lovat et al. |
| 8,120,798 B2 | 2/2012 | Reddy et al. |
| 8,120,799 B2 | 2/2012 | Reddy et al. |
| 8,125,666 B2 | 2/2012 | Mathieson et al. |
| 8,140,613 B2 | 3/2012 | Lum et al. |
| 8,154,760 B2 | 4/2012 | Satoh |
| 8,156,424 B2 | 4/2012 | Chrisop et al. |
| 8,171,404 B2 | 5/2012 | Borchers et al. |
| 8,201,077 B2 | 6/2012 | Reddy et al. |
| 8,213,034 B2 | 7/2012 | Reddy et al. |
| 8,230,328 B2 | 7/2012 | Yamamura et al. |
| 8,237,946 B2 | 8/2012 | Lovat et al. |
| 8,237,977 B2 | 8/2012 | Zhang et al. |
| 8,270,003 B2 | 9/2012 | Lum et al. |
| 6,326,989 B1 | 12/2012 | Yamamoto |
| 8,384,925 B2 | 2/2013 | Lovat et al. |
| 8,428,484 B2 | 4/2013 | Plewnia et al. |
| 8,477,344 B2 | 7/2013 | Kawabuchi et al. |
| 8,654,378 B2 | 2/2014 | Yoshida |
| 8,755,068 B2 | 6/2014 | Sugimoto |
| 8,897,861 B2 | 11/2014 | Ordóñez-Smith et al. |
| 2001/0054086 A1 | 12/2001 | Miyahira |
| 2003/0051215 A1 | 3/2003 | Nakao |
| 2005/0099650 A1 | 5/2005 | Brown et al. |
| 2006/0028675 A1 | 2/2006 | Watanabe et al. |
| 2006/0059462 A1* | 3/2006 | Yamamoto .......... G06F 17/2247 717/115 |
| 2006/0077119 A1 | 4/2006 | Zhang et al. |
| 2006/0077423 A1 | 4/2006 | Mathieson et al. |
| 2006/0077431 A1 | 4/2006 | Zhang et al. |
| 2006/0077443 A1 | 4/2006 | Lum et al. |
| 2006/0085430 A1 | 4/2006 | Yamamura et al. |
| 2006/0095536 A1 | 5/2006 | Mathieson et al. |
| 2006/0119883 A1 | 6/2006 | Lovat et al. |
| 2006/0235318 A1 | 10/2006 | Ordonez Smith |
| 2007/0147610 A1 | 6/2007 | Reddy |
| 2008/0016210 A1 | 1/2008 | Maekawa et al. |
| 2009/0161132 A1 | 6/2009 | Sato |
| 2009/0268229 A1* | 10/2009 | Richardson ........ G03G 15/5087 358/1.15 |
| 2009/0296133 A1 | 12/2009 | Kawabushi et al. |
| 2010/0010333 A1 | 1/2010 | Ordonez-Smith |
| 2010/0046038 A1 | 2/2010 | Matsuda et al. |
| 2010/0053676 A1* | 3/2010 | Sugimoto ............. G06F 3/0238 358/1.15 |
| 2010/0149592 A1 | 6/2010 | Yoshida |
| 2011/0125899 A1 | 5/2011 | Yamamoto |
| 2011/0191431 A1 | 8/2011 | Noguchi |

* cited by examiner

FIG. 6A

```
<html>
  <head>
    <title>SCAN AND TRANSMIT</title>
  </head>
  <body>
    PLACE DOCUMENT ON DOCUMENT PLATEN AND PRESS START KEY
    <from action="/start" method="post"><br/>
      RESOLUTION:
      <select name="resolution">
        <option value="0">100 × 100dpi</option>
        <option value="1">200 × 200dpi</option>
        <option value="2">300 × 300dpi</option>
        <option value="3">600 × 600dpi</option>
      </select>
      <br/>
      <input type="checkbox" name="color" value="1"/>READ IN FULL COLOR<br/><br/>
      <input type="reset" value="RESET"/>
      <input type="submit" value="START (START ALSO POSSIBLE USING START KEY)"/><br/>
    </form>
  </body>
</html>
```

601 — 602 — 603 — 604 — 605

F I G. 8A

```
<html>
  <head>
    <title>SCAN AND TRANSMIT</title>
  </head>
  <body>
    PLACE DOCUMENT ON DOCUMENT PLATEN AND PRESS START KEY
    <from action="start" method="post"><br/>
      RESOLUTION:
      <select name="resolution">
        <option value="0">100 x 100dpi</option>
        <option value="1">200 x 200dpi</option>
        <option value="2">300 x 300dpi</option>
        <option value="3">600 x 600dpi</option>
      </select>
      <br/><br/>
      <input type="submit" value="TRANSMIT IN COLOR" name="color"/>
      <input type="submit" value="TRANSMIT IN MONOCHROME" name="bw"/><br/>
    </form>
  </body>
</html>
```

801 — `<from action="start" method="post"><br/>`
802 — `<select name="resolution">`
803 — `<input type="submit" value="TRANSMIT IN COLOR" name="color"/>`
804 — `<input type="submit" value="TRANSMIT IN MONOCHROME" name="bw"/>`

IMAGE PROCESSING APPARATUS AND METHOD OF CONTROLLING SAME

CLAIM OF PRIORITY

This application is a continuation application of copending U.S. patent application Ser. No. 12/915,294, filed Oct. 29, 2010, which published as U.S. Patent Application Publication No. 2011/0145371 A1 on Jun. 16, 2011, and issued as U.S. Pat. No. 9,137,399 on Sep. 15, 2015.

This application also claims the benefit of Japanese Patent Application No. 2009-285743, filed Dec. 16, 2009, which is hereby incorporated by reference herein in its entirety.

BACKGROUND OF THE INVENTION

1. Field of the Invention

The present invention relates to an image processing apparatus, and to a method of controlling the apparatus, in which an operation can be designated using a hard key on a console unit while the screen of a web browser is being displayed on the console unit.

2. Description of the Related Art

In the prior art, an information processing apparatus such as a personal computer is connected to a web server on a network, and an operation screen provided by the web server is displayed by a web browser with which the information processing apparatus is equipped. In this case, the web browser of the information processing apparatus requests the web server for the operation screen, and a web application of the web server responds to the request from the information processing apparatus by transmitting content, which is for causing the web browser to display the operation screen, to the information processing apparatus. The content is composed of an HTML file, an image file, a script file, and the like. As a result, the web browser of the information processing apparatus analyzes the received content and displays the operation screen that is based upon the descriptions in the content. If a user inputs a command via the operation screen displayed by the web browser, the web browser notifies the web server of the command. The web application of the web server so notified then executes processing in accordance with the command that has been input.

Multifunction peripherals (MFPs) equipped with a scanner and printer have recently come to include those equipped with a web browser of the kind described above. For example, the specification of Japanese Patent Laid-Open No. 2006-127503 discloses art in which a web server provides an operation screen for utilizing various functions possessed by an MFP. In accordance with such prior art, the user of the MFP inputs a command with regard to the MFP via the operation screen displayed on the web browser. The web server is notified of the entered command via the web browser of the MFP, and the web server so notified requests the MFP to execute various processing in accordance with the contents of the command. The MFP so requested executes the requested processing. As a result, all menu data for operating the MFP need no longer be held in the MFP, and the menu data can be changed easily at the web server.

It is preferred that an MFP of the above-described kind that displays an operation screen acquired from a web server on a web browser be capable of providing operability the same as that of an ordinary MFP. In particular, since an operation that instructs an MFP to start processing is one used most often by a user, it is preferred that this method of instruction be made the same as that of an ordinary MFP. Generally, an MFP is equipped with a hard key (a start key) for instructing the start of processing, and the operation for starting processing such as reading or printing of a document is performed by pressing this start key. Accordingly, in an MFP of the kind illustrated in Japanese Patent Laid-Open No. 2006-127503 that displays an operation screen provided by a web server on the web browser of the MFP and that accepts various commands from the user, it is preferred from the standpoint of operability that the operation for starting processing be performed by pressing a start key.

Among the types of information processing apparatus such as the above-described MFP, there is an information processing apparatus in which a web server provides the screens of some applications and another application reads out and executes a program being held within the MFP. Here, an application provided by a web server is referred to as a "web application", and an application executed based upon information already held in an MFP is referred to as a "native application". For example, there is an MFP in which a copy function is provided as a native application and a scan function is provided as a web application. In such an MFP, the user may be confused if there is a difference in operability between the web application and the native application. With a web application, however, it is not possible to accept an operation command based upon use of a hard key provided on the MRP.

In order to instruct the start of processing with a web application, it is required that an HTML form containing information entered by the user be submitted to the web application. However, a button for instructing such submission is displayed on the operation screen as a soft key in accordance with the description of the content, and a form cannot be submitted by a hard key provided on the MFP.

On the other hand, web browsers operated by a personal computer include one in which focus is moved by pressing a tab key provided on the personal computer and a return key is pressed in a state in which the focus is situated on a submit button, thereby enabling transmission (submission) of the contents set forth in a form. Even if such an operation is applied to the web browser of an MFP, an operation is required that entails pressing a start key after the focus is moved. Since such an operation differs from the operation method employed in an ordinary MFP, the user can become confused.

SUMMARY OF THE INVENTION

An aspect of the present invention is to eliminate the above-mentioned problems with the conventional technology.

The present invention provides a technique whereby an operation of accepting various commands from a user in a state in which an operation screen provided by a web server is being displayed on a web browser can be performed by pressing a start key that is a hard key.

According to one aspect, the present invention provides an image processing apparatus having a web browser for displaying an operation screen provided by a web server, the apparatus comprising an analysis unit configured to analyze content that displays the operation screen acquired from the web server, a display unit configured to display the operation screen based upon analysis by the analysis unit, a start key being a hard key configured to instruct start of image processing, a determination unit configured to determine, based upon the analysis by the analysis unit, whether the content includes a description instructing that form data is transmitted to the web server, and a send control unit configured to exercise control in such a manner that the form data is transmitted to the web server in response to pressing of the start key if it is determined by the determination unit that the content includes a description instructing that the form data is transmitted to the web server.

According to another aspect, the present invention provides a method of controlling an image processing apparatus having a web browser for displaying an operation screen provided by a web server, the method comprising analyzing content that displays the operation screen acquired from the web server, displaying the operation screen based upon analysis in the analyzing step, determining, based upon the analysis in the analyzing step, whether the content includes a description instructing that form data is transmitted to the web server, and exercising control in such a manner that the form data is transmitted to the web server in response to pressing of a start key being a hard key for instructing start of image processing if it is determined in the determining step that the content includes a description instructing that the form data be transmitted to the web server.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6A is a diagram illustrating an example of web application screen data received in step S2 in FIG. 5;

FIG. 8A is a diagram illustrating an example of application screen data that includes a plurality of submit elements;

DESCRIPTION OF THE EMBODIMENTS

Embodiments of the present invention will now be described hereafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

A first embodiment of the present invention will be described first. In the first embodiment, an example will be described in which, if a form exists in content that an MFP 101 according to the first embodiment has acquired from a web server 102, then the form is transmitted to the web server by pressing a start key on the console unit of the MFP 101.

Figure 1:
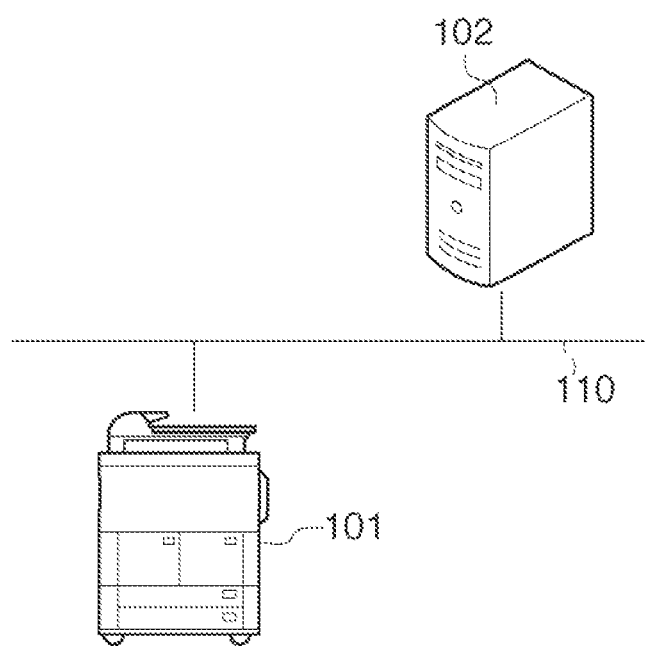
FIG. 1 is a diagram illustrating the configuration of a system that includes an image processing apparatus according to a first embodiment of the present invention.

FIG. 1 is a diagram illustrating the configuration of a system that includes an image processing apparatus (an MFP) according to a first embodiment of the present invention.

The MFP 101 and the web server 102 are connected to a LAN 110 so as to be capable of communicating with each other. Although only one MFP and one server are illustrated in FIG. 1, a plurality of personal computers, MFPs and servers, etc., may just as well be connected to the LAN 110.

Figure 2A:
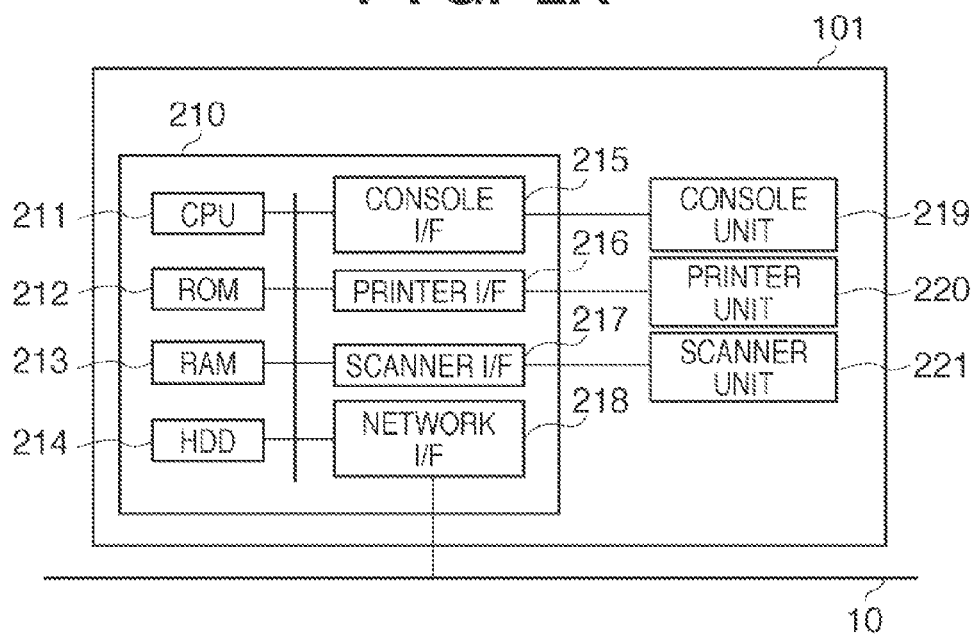
FIG. 2A is a block diagram illustrating the configuration of an MFP according to a first embodiment.

FIG. 2A is a block diagram illustrating the configuration of the MFP 101 according to the first embodiment.

A controller 210 that includes a CPU 211 controls the operation of the overall MFP 101. The CPU 211 reads out a control program that has been stored in a ROM 212 and executes various control processing such as processing for controlling read and transmit. A RAM 213 is used as a temporary storage area such as the main memory and work area of the CPU 211. A hard-disk drive (HDD) 214 stores image data and various programs or various information tables, and the like. A console interface (I/F) 215 controls interfacing between a console unit 219 and the controller 210. The console unit 219 is equipped with a liquid crystal display having a touch-sensitive panel function and with a keyboard, etc. The MFP 101 is further equipped with a web browser function, described later. The web browser of MFP 101 analyzes an HTML file received from the web server 102 and displays an operation screen, which is based upon the description in this HTML file, on a display unit of the console unit 219. The details of the console unit 219 will be described later.

A printer interface (I/F) 216 connects a printer unit 220 and the controller 210. Image data to be printed by the printer unit 220 is transferred from the controller 210 to the printer unit 220 via the printer I/F 216 and is printed on a print medium (sheet) in the printer unit 220. A scanner interface (I/F) 217 connects a scanner unit 221 and the controller 210. The scanner unit 221 reads the image of an original, generates image data and supplies the image data to the controller 210 via the scanner I/F 217. A network interface (I/F) 218 connects the controller 210 to a LAN 110. The network I/F 218 transmits image data and information to an external apparatus (web server 102, for example) on the LAN 110 and receives various information from the external apparatus on the LAN 110.

Figure 2B:
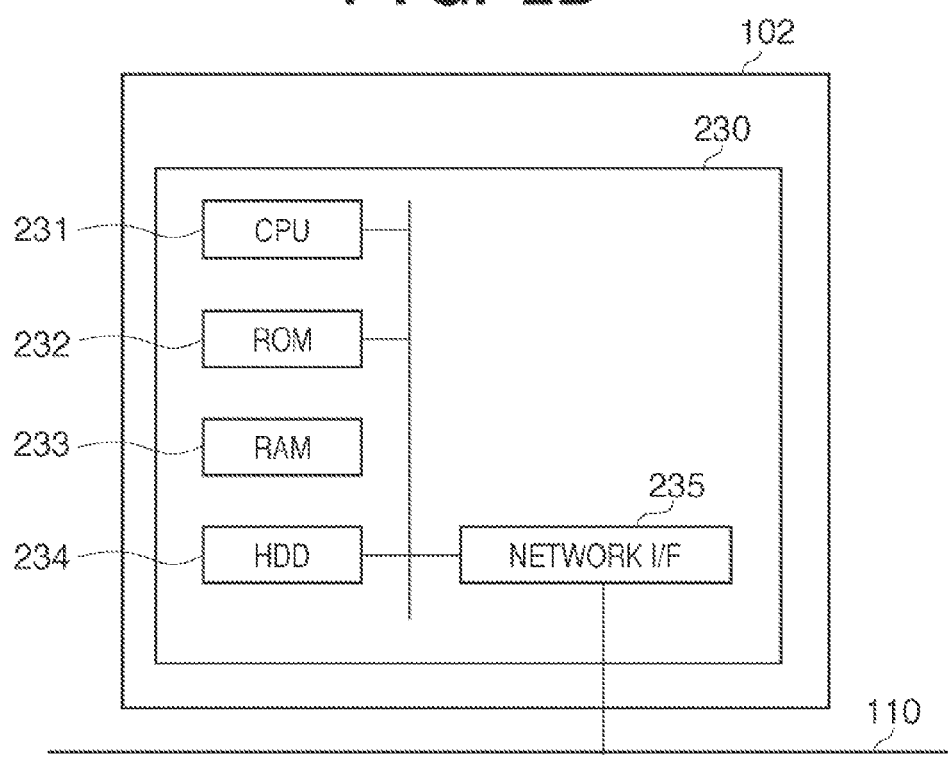
FIG. 2B is a block diagram illustrating the configuration of a web server according to the first embodiment.

FIG. 2B is a block diagram illustrating the configuration of the web server 102 according to the first embodiment.

A controller 230 that includes a CPU 231 controls the operation of the overall web server 102. The CPU 231 executes various control processing by executing a program that has been loaded into a RAM 233 from a hard-disk drive (HDD) 234. A ROM 232 stores a boot program and various data. The RAM 233 is used as a temporary storage area such as the main memory and work area of the CPU 231. The HDD 234 stores image data and various programs or various information tables. A network I/F 235 connects the controller 230 to the LAN 110. The network I/F 235 sends and receives various information to and from other devices on the LAN 110.

Figure 3:
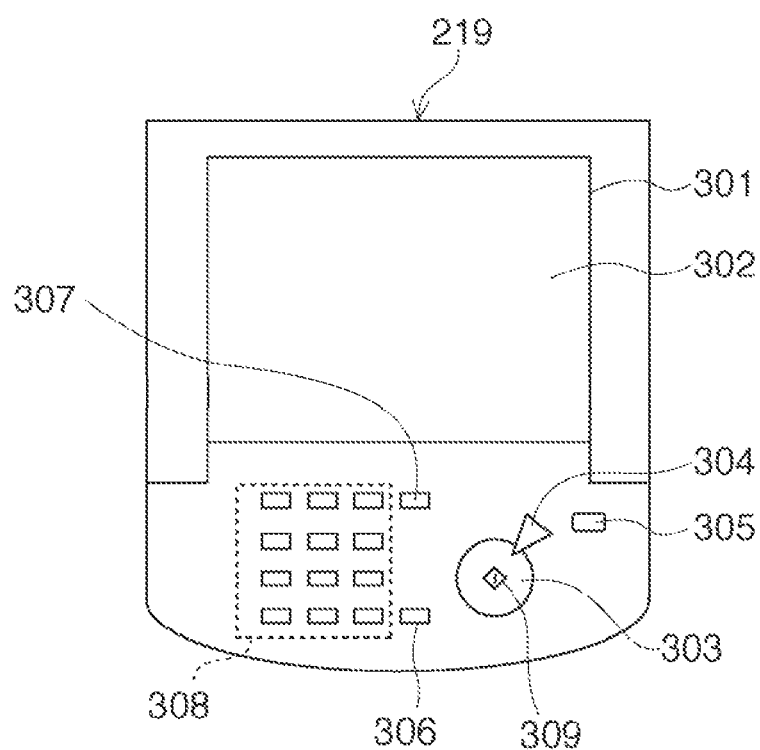
FIG. 3 depicts an external view illustrating the configuration of a console unit of an MFP according to the first embodiment.

Next, the configuration of the console unit 219 of MFP 101 will be described with reference to FIG. 3, which depicts an external view illustrating the configuration of the console unit 219 of the MFP 101 according to the first embodiment.

The console unit 219 has an LCD display unit 301 comprising an LCD and a touch-panel sheet 302 affixed to the LCD. An operation screen and soft keys displayed by a native function module or web browser (described later) are displayed on the LCD display unit 301. When a displayed key is pressed, position information indicating the position pressed is transmitted from the LCD display unit 301 to the CPU 211. The console unit 219 is further provided with various hard keys, namely, a start key 303, a stop key 304, a reset key 305, a guide key 306, a top menu key 307, and numeric keys 308. The start key 303 is a hard key for instructing the MFP 101 to start processing. Provided at the center of the start key 303 is a two-color (green and red) LED display 309. The two-color LED display 309 indicates by its color whether or not the start key 303 is in a usable state. The stop key 304 is a key for stopping operation that is in progress. The reset key 305 is a key used when initializing a setting. The guide key 306 is a key for displaying methods of using the MFP 101. The top menu key 307 is a key for displaying a top menu screen for selecting the function of the MFP 101. The numeric keys 308 are for inputting numerical values.

Figure 4:
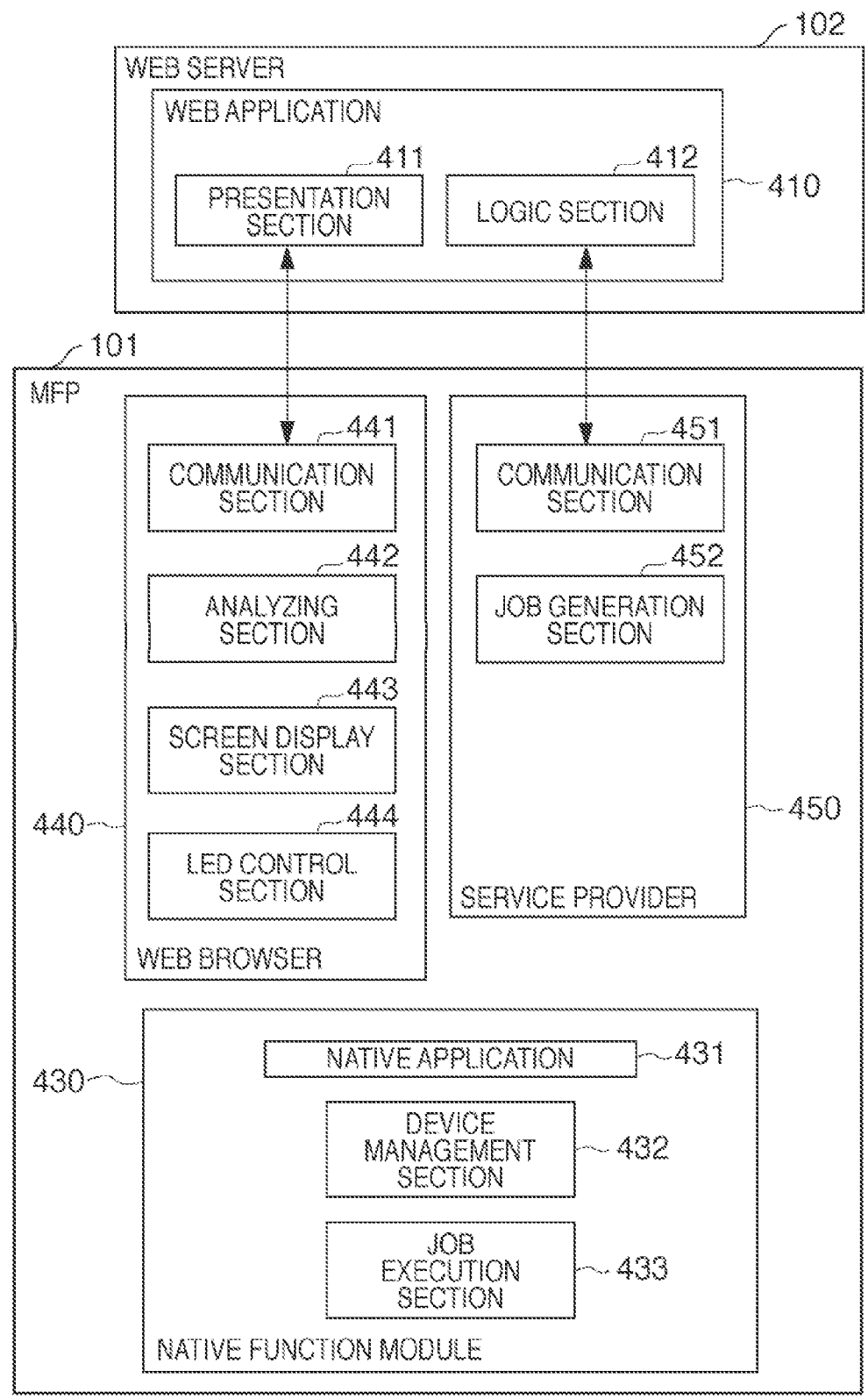
FIG. 4 is a diagram useful in describing the software configuration of the overall system according to the first embodiment.

FIG. 4 is a diagram useful in describing the software configuration of the overall system according to the first embodiment. The functional units shown in FIG. 4 are implemented by having the CPUs 211 and 231, which are provided in the MFP 101 and the web server 102, respectively, execute the corresponding control programs.

The MFP 101 has a native function module 430, which executes functions already possessed by the MFP 101, a web browser 440, and a service provider 450. The web browser 440 includes a communication section 441, an analyzing section 442, a screen display section 443 and an LED control section 444. The communication section 441 communicates with a presentation section 411 of a web application 410 of the web server 102 in accordance with the HTTP protocol. More specifically, the communication section 441 requests the web application 410 for the content of the operation screen that will be displayed by the web browser 440 and receives the content from the web server 102. The communication section 441 further notifies the web application 410 of a user command entered via the operation screen displayed by the web browser 440. The analyzing section 442 analyzes the content of the operation screen received from the web application 410. This content includes an HTML file, an image file, a script file, and the like. These files contain descriptions indicating the contents of the operation screen received from the web application 410. The screen display section 443 displays the operation screen on the LCD display unit 301 of console unit 219 based upon the result of analysis by the analyzing section 442. On the basis of the result of analysis by the analyzing section 442, the LED control section 444 determines whether a form submit element is contained in the HTML file received from the web application 410 and controls the light emission of the two-color LED display 309 at the center of the start key 303.

The service provider 450 includes a communication section 451 and a job generation section 452. The communication section 451 accepts a processing request from a logic section 412 of web application 410. If execution of processing is requested from the web application 410, the job generation section 452 generates a job for executing the requested processing.

The native function module 430 includes native applications 431, a device management section 432, and a job execution section 433. The native applications 431 are various applications provided based upon programs already being held by the MFP 101. They are not provided by the web server 102. For example, the native applications 431 include applications for executing print processing by the printer unit 220 of MFP 101 and for executing read processing by the scanner unit 221 of MFP 101. The job execution section 433 executes jobs generated by the native applications 431 and by the job generation section 452 of service provider 450. The device management section 432 manages the error status of each module of MFP 101 and, if an error occurs, notifies the web browser 440 or service provider 450 of information indicative of the error. The device management section 432 further executes processing for setting the overall MFP 101 and for changing over applications.

The web server 102 has the web application 410. The web application 410 includes the presentation section 411 and logic section 412.

The presentation section 411 communicates with the communication section 441 of MFP 101 and, in response to a request from the MFP 101, sends the MFP 101 the content of an operation screen to be displayed by the web browser 440 of MFP 101. Further, the presentation section 411 accepts from the MFP 101 a user command that has been entered via the operation screen displayed on the web browser 440 of MFP 101. Upon receiving the command from the user, the web application 410 executes various processing in accordance with the contents of the command. Further, in response to the contents of the command from the web browser 440, the web application 410 requests the MFP 101 to execute processing. Specifically, the web application 410 requests execution of print processing by the printer unit 220 of MFP 101, execution of document-read processing by the scanner unit 221 of MFP 101 or execution of transmit processing via the network interface I/F 218. In a case when the web server 102 thus requests the MFP 101 to execute processing, the logic section 412 requests job generation of the job generation section 452 via the communication section 451 of service provider 450 provided in the MFP 101. Assume here that the web application 410 is an application for scanning in a document that has been placed on a document platen and for transmitting the document to a specific FTP server on network 110 using the FTP protocol.

Figure 5:
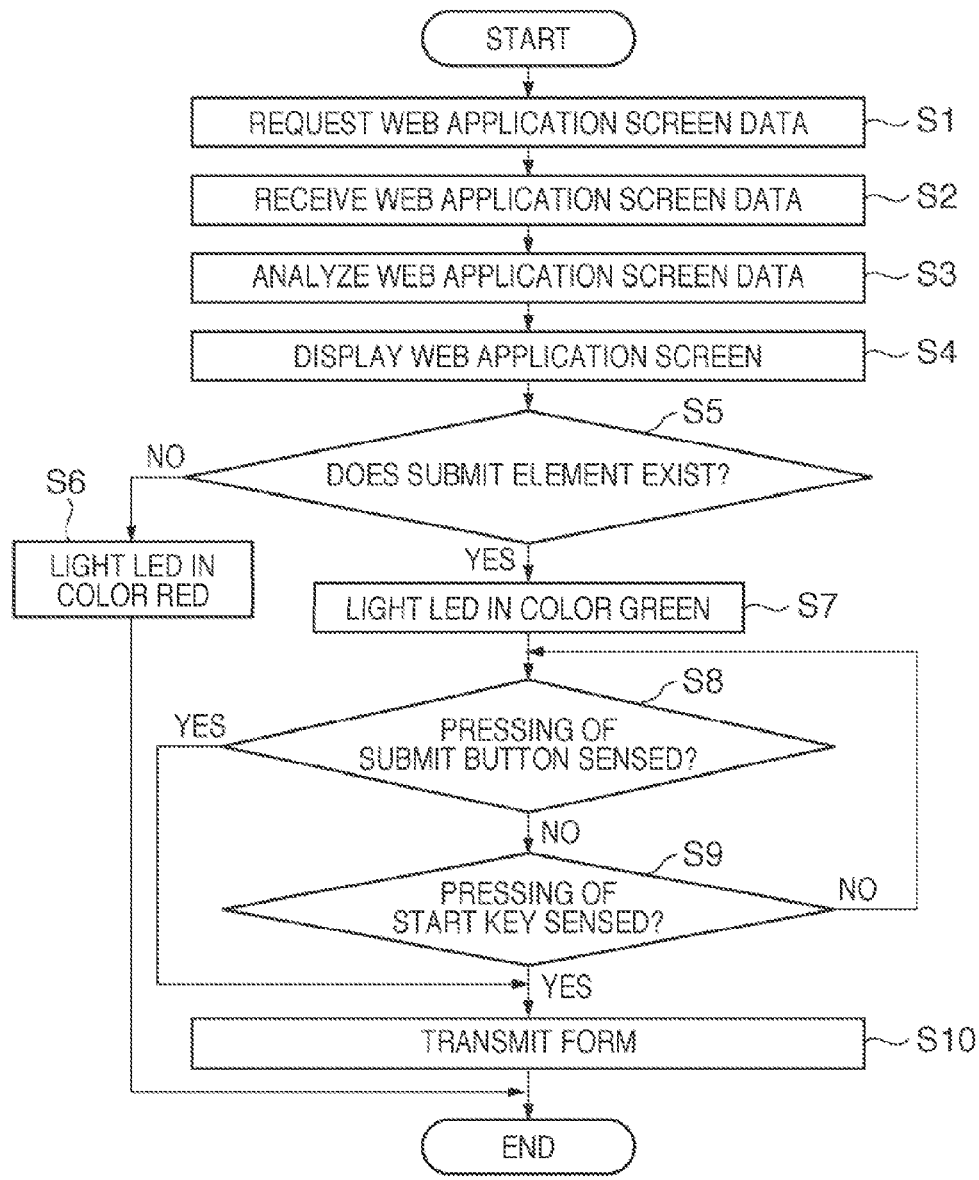
FIG. 5 is a flowchart for describing control processing executed by an MFP according to the first embodiment.

FIG. 5 is a flowchart for describing control processing executed by the MFP 101 according to the first embodiment. Here, reference will be had to the flowchart to describe a series of operations performed by the web browser 440 in a case when the MFP 101 acquires and displays an operation screen from the web application 410, reads in a document in response to the user pressing the start key 303 and transmits the read document to a specific FTP server. It should be noted that each operation indicated in the flowchart is executed as a result of the CPU 211 of MFP 101 running a control program.

First, in step S1, the web server 102 is requested for the operation screen of web application 410 by the web browser 440, which operation screen will be displayed on the web browser 440 of MFP 101. Specifically, the MFP 101 communicates with the URL of the web application 410 in accordance with the HTTP protocol. This URL may be a URL set previously as the home page, etc., of the web browser 440, or a URL that the user has input to a URL input field of the web browser 440. Alternatively, the URL may be that of a link that the user has selected on the screen being displayed by the web browser 440. Next, in step S2, screen data, which is the response from the web application 410, is received. As mentioned above, the screen data is composed of an HTML file, an image file and a script file, etc. Next, in step S3, the web application screen data received in step S2 is analyzed. As the result of analysis, whether or not the application screen data includes a form submit element is stored in RAM 213, or the like, in step S3. Next, in step S4, the web application screen is displayed on the LCD display unit 301 of console unit 219 based upon the result of analysis in step S3.

Figure 6B:
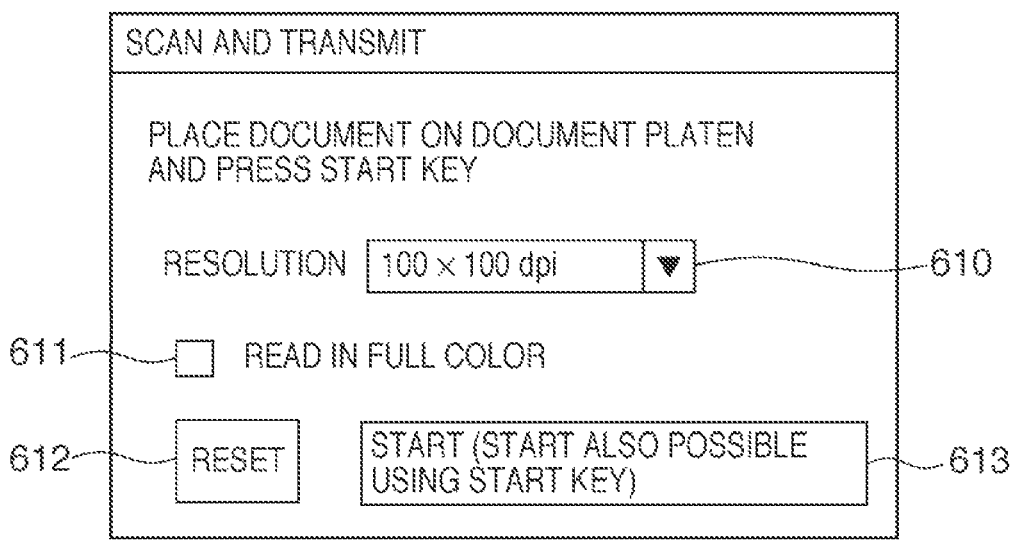
FIG. 6B is a diagram illustrating an example of a screen displayed in step S4 in FIG. 5 in a case when the screen data shown in FIG. 6A has been received.

FIG. 6A is a diagram illustrating an example of web application screen data received in step S2 in FIG. 5, and FIG. 6B is a diagram illustrating an example of a screen displayed on the LCD display unit 301 in step S4 in FIG. 5 in a case when the screen data shown in FIG. 6A has been received.

In FIG. 6A, a start tag 601 of a form indicates that the form will be transmitted in response to "./start" by the POST method in a case when a submit command is issued by an action attribute and a method attribute. A select element 602 is for designating resolution at which reading is performed. Upon receiving this screen data, the web browser 440 renders these resolutions in the form of a pull-down menu shown at 610 in FIG. 6B and makes it possible for the user to select a resolution. A check box element 603 is for designating whether a document should be read in full color. In accordance with this element 603, the web browser 440 renders a check box of the kind indicated at 611 in FIG. 6B. A reset element 604 is provided for allowing the user to reset a setting. In accordance with this element 604, the web browser 440 renders a reset button 612 in FIG. 6B. The web browser 440 renders a submit button 613 in FIG. 6B based upon a submit element 605 in FIG. 6A. If the submit button 613 is pressed by the user, then, in accordance with the description of start tag 601, the web browser 440 transmits this form data by the POST method in response to "./start". Furthermore, the fact that processing identical with processing executed owing to pressing of the submit button 613 is executable also by pressing the start key 303 on console unit 219 is described as a value attribute of the submit element 605. It should be noted that the web browser 440 displays a character string "START (START ALSO POSSIBLE USING START KEY)" as the submit button 613.

With reference again to FIG. 5, it is determined, in step S5, based upon the analysis performed in step S3, whether a form submit element exists in the data received in step S2. If it is determined in step S5 that a submit element does not exist, then processing proceeds to step S6. Here, control is exercised by the LED control section 444 in such a manner that the LED display 309 at the center of the start key 303 lights in the color red. As a result, the user is notified of the fact that an operation command using the start key 303 is not possible during display of this screen.

On the other hand, if the result of the determination in step S5 is that the data received in step S2 includes a submit element, then processing proceeds to step S7. For example, in a case when the data shown in FIG. 6A has been received, this data includes the submit element 605 and, hence, processing proceeds to step S7. In step S7, control is exercised by the LED control section 444 in such a manner that the LED display 309 at the center of the start key 303 lights in the color green. In this way, the user is notified of the fact that an operation command using the start key 303 is possible during display of this screen. Next, at step S8, it is determined whether the submit button 613 in FIG. 6B has been pressed. Processing proceeds to step S10 if it is sensed that the submit button 613 has been pressed. On the other hand, if pressing of the submit button 613 is not sensed, then processing proceeds to step S9, and it is determined whether the start key 303 has been pressed. If pressing of the start key 303 is sensed, processing proceeds to step S10. Here, processing for transmitting the form is executed in accordance with the description of the HTML file. Accordingly, processing for transmitting the form data by the POST method in response to "./start" is executed.

Thereafter, the form transmitted by the web browser 440 is received by the web application 410 of web server 102. Further, the web application 410 communicates with the service provider 450 of MFP 101, and controls the MFP 101 in such a manner that the document is read in at the designated resolution and transmitted by FTP.

Thus, in accordance with the first embodiment, as described above, when a submit element is included and the start key is usable, processing for submitting a form included in the content of an operation screen is executed automatically if the start key 303 on console unit 219 of the MFP 101 is pressed. As a result, on the basis of the submitted form data, the web application 410 of the web server 102 instructs the MFP 101 to start control such as document read, or the like, by way of example. This makes it possible to provide excellent operability, namely, the ability to instruct the start of processing by the start key 303 on console unit 219 of MFP 101 using the web application or a native application.

It should be noted that, although the present invention is illustrated in a form in which the web application 410 instructs the service provider 450 of MFP 101 to perform control of reading a document by the MFP 101, the invention is not limited to this arrangement. For example, an arrangement may be adopted in which a script that describes processing to be executed by the MFP 101 is transmitted from the web application 410 of web server 102 to the web browser 440 of MFP 101, and the MFP 101 analyzes this script to thereby control the MFP 101.

A second embodiment of the present invention will be described next. The second embodiment will be described with regard to a case when the arrangement of the first embodiment is additionally provided with control for dealing with a situation in which HTML data containing a plurality of submit elements is received. The system configuration and the configurations of the web server 102 and MFP 101 in the second embodiment are identical with those of the first embodiment, and need not be described again.

Figure 7:
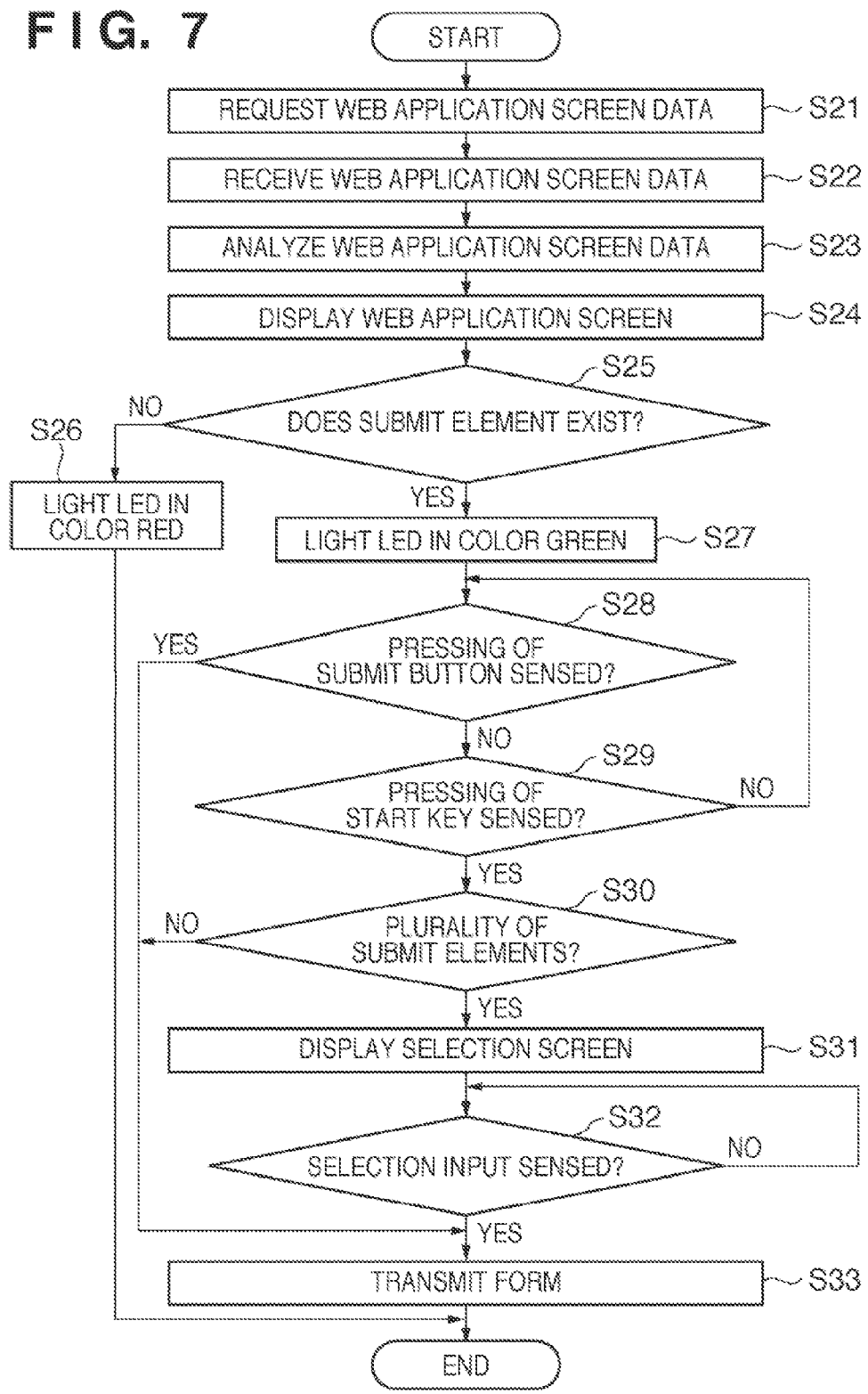
FIG. 7 is a flowchart for describing processing executed by an MFP according to a second embodiment of the present invention.

FIG. 7 is a flowchart for describing processing executed by the MFP 101 according to the second embodiment of the present invention. Here, reference will be had to the flowchart to describe a series of operations performed by the web browser 440 in a case when the MFP 101 acquires and displays an operation screen from the web application 410, reads in a document in response to the user pressing the start key 303, and transmits the document to a specific FTP server. Each operation indicated in the flowchart is executed as a result of the CPU 211 of MFP 101 running a control program. Here, the processing from step S21 to step S27 is similar to the processing from step S1 to step S7 in FIG. 5, and need not be described again.

In step S28, it is determined whether a submit button (811 or 812 in FIG. 8B) has been pressed. If pressing of a submit button is sensed, processing proceeds to step S33, and processing for transmitting a form corresponding to the submit button whose pressing has been sensed is executed. On the other hand, if pressing of a submit button is not sensed, then processing proceeds to step S29. Here, it is determined whether the start key 303 on console unit 219 has been pressed. If pressing of the start key 303 is sensed in step S29, then processing proceeds to step S30. Here, it is determined whether the data received in step S21 includes a plurality of submit elements. If it is determined in step S30 that only one submit element exists, then processing proceeds to step S33. If it is determined in step S30 that a plurality of submit elements exist, then processing proceeds to step S31. In step S31 ("DISPLAY SELECTION SCREEN"), a screen is displayed that makes it possible for the user to select for which of the plurality of submit elements.

Figure 8B:
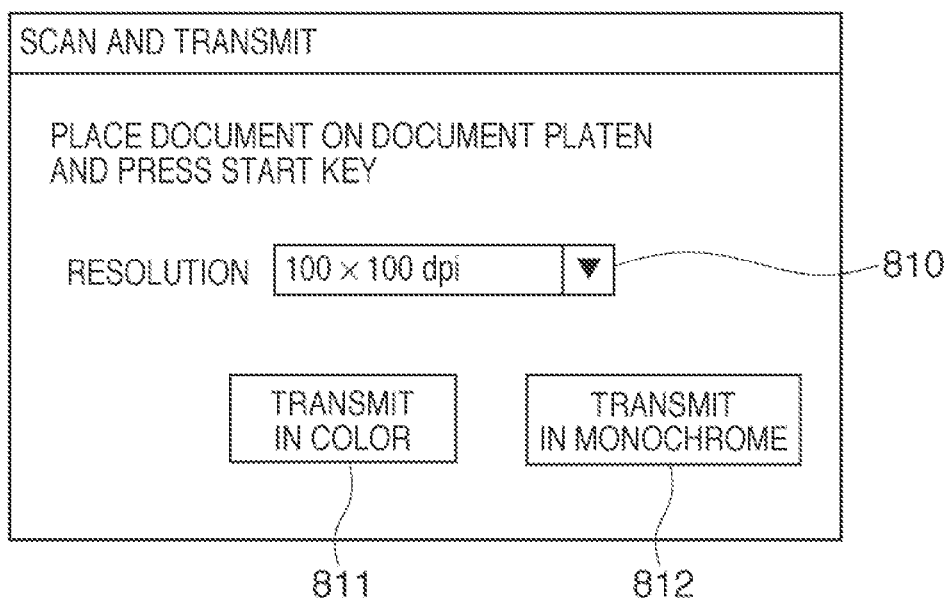
FIG. 8B is a diagram illustrating an example of a screen displayed on a display unit in a case when the screen data shown in FIG. 8A has been received.

FIG. 8A is a diagram illustrating an example of application screen data that includes a plurality of submit elements, and FIG. 8B is a diagram illustrating an example of a screen displayed on the display unit 301 in a case when the screen data shown in FIG. 8A has been received.

In FIG. 8A, a start tag 801 of a form indicates that the form is to be transmitted by the POST method in response to "./start" in a case when a submit command is issued by an action attribute and a method attribute. A select element 802 is provided for designating resolution. On the basis of the select element, the web browser 440 renders a pull-down menu of the kind shown at 810 in FIG. 8B. On the basis of a first submit element 803, the web browser 440 renders a first submit button of the kind shown at 811 in FIG. 8B. On the basis of a second submit element 804, the web browser 440 renders a second submit button of the kind shown at 812 in FIG. 8B.

Figure 9:
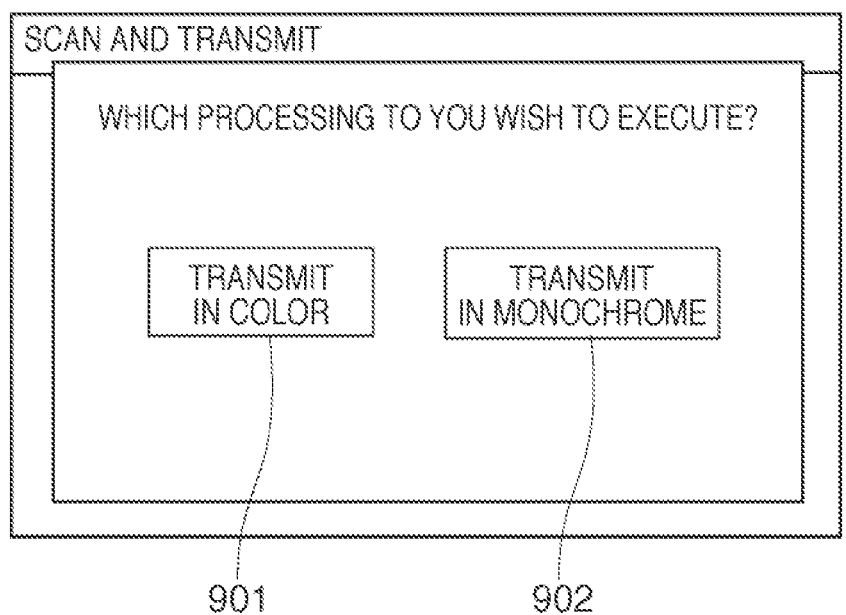
FIG. 9 is a diagram illustrating an example of a selection screen displayed in step S31 in FIG. 7.

FIG. 9 is a diagram illustrating an example of a selection screen displayed in step S31 in FIG. 7.

A button 901 corresponding to the first submit element and a button 902 corresponding to the second submit element are displayed so as to be selectable by the user.

With reference again to the flowchart of FIG. 7, whether the user has input a selection is sensed in step S32. Processing proceeds to step S33 if a selection input is sensed. Specifically, whether the button 901 or 902 in FIG. 9 has been pressed is sensed. If either button 901 or 902 is sensed to have been pressed, processing proceeds to step S33. Here, transmit processing corresponding to the selected button is executed.

Thereafter, the form that has been transmitted by the web browser 440 is received by the web application 410. Based upon the contents of the form received, the web application 410 determines which submit processing has been executed. The web application 410 communicates with the service provider 450 and controls the MFP 101 in such a manner that the document is read in color or monochrome, and transmitted by FTP.

Thus, in accordance with the second embodiment, as described above, if, when the start key of MFP 101 is pressed, a plurality of submit elements exist, a screen that makes it possible to select which submit element is to be processed is displayed. This makes it possible to provide excellent operability, namely, the ability to instruct the start of processing by the start key even with an application in which a plurality of submit elements exist.

It should be noted that it may be so arranged that which submit element is to be processed when the start key is pressed is written in content as an attribute of the submit element beforehand, and submit processing is executed in accordance with this description when the start key is pressed.

Aspects of the present invention can also be realized by a computer of a system or an apparatus (or devices such as a CPU or an MPU) that reads out and executes a program recorded on a memory device to perform the functions of the above-described embodiment(s), and by a method, the steps of which are performed by a computer of a system or an apparatus by, for example, reading out and executing a program recorded on a memory device to perform the functions of the above-described embodiment(s). For this purpose, the program is provided to the computer, for example, via a network or from a recording medium of various types serving as the memory device (for example, a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

I claim:

1. An image processing apparatus comprising:
    an operation unit having a hardware key for accepting a user operation;
    a light emitting device corresponding to the hardware key;
    a display unit configured to display an operation screen based on content obtained from a web server;
    a control unit configured to cause the light emitting device to emit light in a case when the content includes a description for instructing operation to transmit data input via the operation screen to the web server; and
    a transmission unit configured to transmit the data input via the operation screen to the web server when the hardware key is operated by a user while the operation screen is being displayed based on the content including the description.

2. The apparatus according to claim 1, wherein the control unit causes the light emitting device corresponding to the hardware key to emit light with a predetermined color.

3. The apparatus according to claim 1, wherein the control unit controls operation to notify a user that the hardware key is not operable in response to having determined that the content does not include the description.

4. The apparatus according to claim 1, wherein the light emitting device is arranged at a center of the hardware key.

5. An image processing apparatus comprising:
    an operation unit having a hardware key for accepting a user operation;
    a display unit configured to display an operation screen based on content obtained from a web server;
    a control unit configured to enable the hardware key and to notify a user that an instruction using the hardware key is able to be input, in a case when the content includes a description for instructing operation to transmit data input via the operation screen to the web server; and
    a transmission unit configured to transmit the data input via the operation screen to the web server when the hardware key that is enabled by the control unit is operated by a user while the operation screen is being displayed.

6. The apparatus according to claim 5, wherein the control unit causes a light emitting device corresponding to the hardware key to emit light to notify the user that the hardware key is operable.

7. The apparatus according to claim 5, wherein the control unit controls operation to notify the user that the hardware key is not operable in response to having determined that the content does not include the description.

8. An image processing apparatus comprising:
    an operation unit having a hardware key for accepting a user operation;
    a light emitting device corresponding to the hardware key;
    a display unit configured, based on content obtained from a web server, to display an operation screen including at least a software key for accepting a user operation; and
    a control unit configured to cause the light emitting device to emit light in a case when the content includes a predetermined description,
    wherein the control unit controls operation to transmit data input via the operation screen to a web server in any one of cases that the software key included in the operation screen is operated by a user and (ii) the hardware key corresponding to the light emitting device is operated by a user.

9. The apparatus according to claim 8, wherein the control unit causes the light emitting device to emit light with a predetermined color.

10. The apparatus according to claim 8, wherein the control unit controls operation to notify a user that the hardware key is not operable in response to having determined that the content does not include the predetermined description.

11. The apparatus according to claim 8, wherein the light emitting device is arranged at a center of the hardware key.

12. The apparatus according to claim 1, wherein the content includes an HTML file and the description is a submit element.

13. The apparatus according to claim 1, further comprising a selection unit configured to select any one of a plurality of descriptions to transmit the data in a case that the content includes the plurality of descriptions.

14. The apparatus according to claim 1, wherein the hardware key is a start key.

15. The apparatus according to claim 14, further comprising a processing unit configured to read an original to generate image data in response to an operation of the start key.

16. The apparatus according to claim 15, wherein the operation screen includes an item for designating a resolution of reading an original and the transmission unit transmits data input via the item to the web server.

17. The apparatus according to claim 15, wherein the operation screen includes an item for designating operation to read an original in one of a color mode and a monochrome mode, and the transmission unit transmits data input via the item to the web server.

18. The apparatus according to claim 1, wherein the hardware key is a predetermined key of a plurality of hardware keys provided on the operation unit.

19. The apparatus according to claim 8, wherein the software key is a button for instructing operation to start reading an original.

20. A method of controlling an image processing apparatus that includes an operation unit having a hardware key for accepting a user operation and a light emitting device corresponding to the hardware key, the method comprising:

displaying an operation screen based on content obtained from a web server;

causing the light emitting device to emit light in a case when the content includes a description for instructing operation to transmit data input via the operation screen to the web server; and transmitting the data input via the operation screen to the web server when the hardware key is operated by a user while the light emitting device emits light.

21. A method of controlling an image processing apparatus that includes an operation unit having a hardware key for accepting a user operation, the method comprising:

displaying an operation screen based on content obtained from a web server;

enabling the hardware key and notifying a user that an instruction using the hardware key is able to be input, in a case when the content includes a description for instructing operation to transmit data input via the operation screen to the web server; and transmitting the data input via the operation screen to the web server when the hardware key that is enabled in the enabling is operated by a user while the operation screen is being displayed.

22. A method of controlling an image processing apparatus that includes an operation unit having a hardware key for accepting a user operation and a light emitting device corresponding to the hardware key, the method comprising:

displaying an operation screen including at least a software key for accepting a user operation based on content obtained from a web server;

causing the light emitting device to emit light in a case when the content includes a predetermined description; and transmitting data input via the operation screen to a web server in any one of cases that the software key included in the operation screen is operated by a user and (ii) the hardware key corresponding to the light emitting device is operated by a user.

* * * * *